US007906575B2

(12) United States Patent
Nanba et al.

(10) Patent No.: US 7,906,575 B2
(45) Date of Patent: Mar. 15, 2011

(54) CROSSLINKED RUBBER MOLDINGS FOR GOLF BALLS AND METHOD OF MANUFACTURE

(75) Inventors: Atsushi Nanba, Chichibu (JP); Jun Shindo, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 1250 days.

(21) Appl. No.: 11/481,004

(22) Filed: Jul. 6, 2006

(65) Prior Publication Data

US 2006/0293429 A1 Dec. 28, 2006

Related U.S. Application Data

(63) Continuation-in-part of application No. 11/101,549, filed on Apr. 8, 2005, now Pat. No. 7,381,776.

(51) Int. Cl.
*C08K 3/22* (2006.01)
*A63B 37/00* (2006.01)
*A63B 37/12* (2006.01)

(52) U.S. Cl. ..................... 524/430; 525/387; 525/332.5; 473/351; 473/371; 473/378

(58) Field of Classification Search .................. 524/430; 473/351, 371, 378; 525/332.5
See application file for complete search history.

(56) References Cited

U.S. PATENT DOCUMENTS 5,817,735 A * 10/1998 Hatch et al. ..................... 528/84
6,620,061 B1 * 9/2003 Ichikawa et al. .............. 473/378
2003/0236135 A1 * 12/2003 Hogge et al. .................. 473/351
2004/0102580 A1 * 5/2004 Kataoka et al. ............ 525/332.5

FOREIGN PATENT DOCUMENTS

JP 10-043330 * 2/1998
JP 10-43330 A 2/1998

OTHER PUBLICATIONS

Science and Golf IV—Proceedings of the World Scientific Congress of Golf Edited by Eric Thain.

* cited by examiner

*Primary Examiner* — Duane Smith
*Assistant Examiner* — Ives Wu
(74) *Attorney, Agent, or Firm* — Sughrue Mion, PLLC

(57) ABSTRACT

The invention provides a molded and crosslinked rubber material for golf balls which is obtained by molding and crosslinking a rubber composition containing rubber and rubber compounding ingredients, including a base rubber, a filler and an organic peroxide, into a spherical body of one or more layers. A monomer is impregnated into the molded and crosslinked rubber material, and one or both of the following chemical reactions is induced:

(i) chemical reaction of the monomer with the rubber and/or a rubber compounding ingredient, (ii) chemical reaction of the monomer itself.

The depth of impregnation by the monomer from a surface of the molded and crosslinked rubber material to the interior thereof is at least 0.3 mm. The invention also provides a method for manufacturing such a molded and crosslinked rubber material for golf balls. The invention enables the hardness profile, which is the surface hardness of the molded and crosslinked rubber material in combination with the cross-sectional hardness at given depths from the surface, to be adjusted as desired. In particular, when the molded and crosslinked rubber material is used as a golf ball core, the degree of freedom in the core hardness design, i.e., the surface and cross-sectional hardness profile of the core, can be improved.

8 Claims, No Drawings

CROSSLINKED RUBBER MOLDINGS FOR GOLF BALLS AND METHOD OF MANUFACTURE

CROSS-REFERENCE TO RELATED APPLICATION

This application is a continuation-in-part of copending application Ser. No. 11/101,549 filed on Apr. 8, 2005, now U.S. Pat. No. 7,381,776 the entire contents of which are hereby incorporated by reference.

BACKGROUND OF THE INVENTION

The present invention relates to a molded and crosslinked rubber material suitable for use as a one-piece golf ball material and as the core material in solid golf balls such as two-piece golf balls and three-piece golf balls. The invention relates also to a method of manufacturing such a molded and crosslinked rubber material.

Golf balls known to the art include solid golf balls composed of a solid core obtained by molding and crosslinking a rubber composition containing various rubber compounding ingredients and a one-layer or multilayer cover which encloses the solid core, and one-piece golf balls obtained by molding and crosslinking a rubber composition and using the resulting spherical object in its entirety as the ball. In these golf balls, a rubber composition composed chiefly of a base rubber is molded and vulcanized to produce a spherical crosslinked molding as the core. By adjusting the hardness difference between the center portion and surface portion thereof, it is possible to increase the degree of freedom in the ball hardness profile. To this end, JP-A 10-43330 discloses a golf ball having a core in which silica particles are included at the core surface as a means for increasing the surface hardness of the ball.

However, in such golf balls, because the silica particles are merely an inorganic filler, the interfacial loss of material arises, worsening the rebound.

SUMMARY OF THE INVENTION

The object of the present invention is to provide a molded and crosslinked rubber material for golf balls which further increases the degree of freedom in the hardness design of the hardness profile from the core surface to the core interior, and to provide also a method of manufacturing such a molded and crosslinked rubber material for golf balls.

As a result of extensive investigations, we have discovered that, in a molded and crosslinked rubber material for golf balls obtained by molding and crosslinking a rubber composition containing rubber and rubber compounding ingredients, including a base rubber, a filler and an organic peroxide, into a spherical body of one or more layers, by impregnating a monomer into the molded and crosslinked rubber material and inducing a chemical reaction between the monomer and the rubber or the rubber compounding ingredients and/or a chemical reaction by the monomer itself and adjusting the depth of monomer impregnation into the interior of the molded and crosslinked rubber material from the surface thereof to at least 0.3 mm, the cross-sectional hardness of the molded and crosslinked rubber material at given depths from the surface can be varied to a considerable degree from the surface hardness. We have thus succeeded in further increasing the degree of freedom in the design of the ball hardness over what was possible in the prior art.

Accordingly, the invention provides the following molded and crosslinked rubber material for golf balls (I), and the following method of manufacture thereof (II).

I. A molded and crosslinked rubber material for golf balls which is obtained by molding and crosslinking a rubber composition comprising rubber and rubber compounding ingredients, including a base rubber, a filler and an organic peroxide, into a spherical body of one or more layers, wherein a monomer is impregnated into the molded and crosslinked rubber material; one or both of the following chemical reactions is induced:

(i) chemical reaction of the monomer with the rubber and/or a rubber compounding ingredient, (ii) chemical reaction of the monomer itself;

and the depth of impregnation by the monomer from a surface of the molded and crosslinked rubber material to the interior thereof is at least 0.3 mm.

II. A method of manufacturing a molded and crosslinked rubber material for golf balls, comprising the steps of: molding and crosslinking a rubber composition comprising rubber and rubber compounding ingredients, including a base rubber, a filler and an organic peroxide, into a spherical body of one or more layers; impregnating a monomer into the spherical molded and crosslinked rubber material; and heating the monomer-impregnated molded and crosslinked rubber material at a temperature of at least 80° C. for at least 20 minutes.

DETAILED DESCRIPTION OF THE INVENTION

The molded and crosslinked rubber material for golf balls of the invention and the inventive method of manufacture thereof are described more fully below.

The inventive molded and crosslinked rubber material for golf balls is obtained by molding under the application of heat a rubber composition which contains rubber compounding ingredients such as a base rubber, a filler and an organic peroxide and which can be used to make a one-piece golf ball or to make the core of a two-piece solid golf ball or a multi-piece solid golf ball having three or more layers. A monomer is then impregnated into the resulting molded and crosslinked rubber material and heat is applied so as to induce a specific chemical reaction at the interior of the molded and crosslinked rubber material, thereby providing the molded and crosslinked rubber material with a varied hardness profile.

The base rubber may be a diene rubber that has hitherto been used in solid golf balls. Illustrative examples include butadiene rubbers (BR), styrene-butadiene rubbers (SBR), isoprene rubbers (IR), chloroprene rubbers (CR), acrylonitrile-butadiene rubbers (NBR), ethylene-propylene-diene rubbers (EPDM), silicone rubbers, and modified forms thereof. These may be used singly or as combinations of two or more thereof. No particular limitation is imposed on conditions such as the synthesis catalyst, Mooney viscosity and molecular weight of these rubbers. The use of a high cis-content polybutadiene rubber having a cis-1,4 bond content of at least 40%, and preferably at least 90%, is especially desirable. A high cis-content polybutadiene synthesized with a lanthanide series catalyst is preferred, although other high-cis polybutadienes obtained with a nickel or cobalt catalyst can also be used. Specific examples include commercial products such as BR01 and BR730 produced by JSR Corporation, and CB22 and CB24 produced by Bayer AG.

An inorganic filler is included as an essential ingredient in the base rubber. Illustrative examples of the inorganic filler include zinc oxide, calcium carbonate, calcium oxide, magnesium oxide, barium sulfate and silica. The use of a metal oxide such as zinc oxide, calcium oxide or magnesium oxide is preferred. The metal oxide has an average particle size of preferably not more than 0.8 μn, and more preferably not more than 300 nm.

Specific examples of organic peroxides include cyclohexanone peroxide, methylcyclohexanone peroxide, acetylacetone peroxide, 1,1-di(t-hexylperoxy)-3,3,5-trimethylcyclohexane, 1,1-di(t-hexylperoxy)cyclohexane, 1,1-di(t-butylperoxy)-2-methylcyclohexane, 1,1-di(t-butylperoxy) cyclohexane, 2,2-di(t-butylperoxy)butane, n-butyl-4,4-di(t-butylperoxy)valerate, 2,2-di(4,4-di(t-butylperoxy) cyclohexyl)propane, p-methane hydroperoxide, diisopropylbenzene hydroperoxide, 1,1,3,3-tetramethylbutyl hydroperoxide, cumene hydroperoxide, t-butyl hydroperoxide, di(2-t-butylperoxyisopropyl)benzene, dicumyl peroxide, 2,5-dimethyl-2,5-di(t-butylperoxy)hexane, t-butylcumyl peroxide, di-t-hexyl peroxide, di-t-butyl peroxide, 2,5-dimethyl-2,5-di(t-butylperoxy)-3-hexane, diisobutyryl peroxide, di(3,3,5-trimethylhexanoyl)peroxide, di-n-octanoyl peroxide, dilauroyl peroxide, distearoyl peroxide, disuccinic acid peroxide, di(3-methylbenzoyl peroxide), dibenzoyl peroxide, di(4-methylbenzoyl)peroxide, di-n-propylperoxy dicarbonate, diisopropyl peroxydicarbonate, di(4-t-butylcyclohexyl) peroxydicarbonate, di(2-ethoxyethyl)peroxydicarbonate, di(3-methoxybutyl)peroxydicarbonate, di-sec-butyl peroxydicarbonate, cumyl peroxyneodecanoate, 1,1,3,3-tetramethylbutyl peroxyneodecanoate, 1-cylohexyl-1-methylethyl peroxyneodecanoate, t-butyl peroxyneodecanoate, t-hexyl peroxypivalate, 1,1,3,3-tetramethylbutyl peroxy-2-ethylhexanoate, 2,5-dimethyl-2,5-di(2-ethylhexanoylperoxy)hexane, t-hexylperoxy-2-ethylhexanoate, t-butylperoxy-2-ethylhexanoate, t-butyl peroxyisobutyrate, t-hexyl peroxyisopropyl monocarbonate, t-butyl peroxymaleic acid, t-butyl peroxy-3,3,5-trimethylhexanoate, t-butyl peroxylaurate, 2,5-dimethyl-2,5-di(3-methylbenzoyl peroxy)hexane, t-butyl peroxyisopropyl monocarbonate, t-butyl peroxy-2-ethylhexyl monocarbonate, t-hexyl peroxybenzoate, 2,5-dimethyl-2,5-di(benzoyl peroxy)hexane, t-butyl peroxyacetate, t-butyl peroxy-3-methyl benzoate, t-butyl peroxybenzoate, t-butyl peroxyallyl monocarbonate, t-butyltrimethylsilyl peroxide, 3,3',4,4'-tetra(t-butylperoxycarbonyl)benzophenone and 2,3-dimethyl-2,3-diphenylbutane.

The amount of organic peroxide included per 100 parts by weight of the base rubber, while not subject to any particular limitation, is preferably at least 0.1 part by weight, and more preferably at least 0.2 part by weight, but preferably not more than 5.0 parts by weight, and more preferably not more than 3 parts by weight.

α,β-Unsaturated carboxylic acids such as acrylic acid and methacrylic acid and/or metal salts thereof may be included in the rubber composition. Examples of the metal include zinc, sodium, potassium, magnesium, lithium and calcium. An unsaturated carboxylic acid ester, such as butyl acrylate, ethylene glycol dimethacrylate, trimethylolpropane trimethacrylate, triallylisocyanurate or glycidyl methacrylate, may also be included, either in combination with the above compounds or alone.

The amount of such compounds included per 100 parts by weight of the base rubber, while not subject to any particular limitation, is preferably at least 5 parts by weight, and more preferably at least 15 parts by weight, but preferably not more than 60 parts by weight, and more preferably not more than 40 parts by weight.

In the practice of the invention, other rubber compounding ingredients that may be suitably added include sulfur, inorganic sulfur compounds, and various types of inorganic compounds other than those mentioned above.

In addition, an organosulfur compound may optionally be included in the rubber composition to enhance the rebound of the spherical molded and crosslinked rubber material. Exemplary organosulfur compounds include thiophenols, thionaphthols, halogenated thiophenols, and metal salts thereof. Specific examples include pentachlorothiophenol, pentafluorothiophenol, pentabromothiophenol, p-chlorothiophenol, and the metal salts thereof, especially the zinc salts. The amount of organosulfur compound included per 100 parts by weight of the base rubber is preferably at least 0.2 part by weight but not more than 5 parts by weight. Moreover, elemental sulfur or an inorganic sulfur compound may be added to increase the cross-sectional hardness profile of the spherical crosslinked molded body. Known processing aids, such as that produced by Rhein Chemie under the trade name Aktiplast, may be added to improve the processability of the rubber composition. Other materials that may be added to the rubber composition include ground golf ball cores, ground golf ball cover stock, ground used golf balls, and also rubber and plastic waste from manufacturing operations that has been ground up.

If necessary, an antioxidant may be included in the rubber composition. In such a case, the antioxidant may be included in an amount, per 100 parts by weight of the base rubber, of at least 0.05 part by weight, and preferably at least 0.1 part by weight, but preferably not more than 3 parts by weight. Examples of commercial products that may be used as the antioxidant include Nocrac NS-6 and Nocrac NS-30 (both produced by Ouchi Shinko Chemical Industry Co., Ltd.), and Yoshinox 425 (produced by Yoshitomi Pharmaceutical Industries, Ltd.).

Aside from the above rubber composition, a silicone powder may be included in a suitable amount. If a silicone powder is used, there is no particular limitation on the particle size of the silicone powder or the functional groups with which it is modified. It is also possible to include, aside from the above rubber composition, suitable amounts of various thermoplastic resins.

The molded and crosslinked rubber material of the invention can be obtained by using a process like that employed with known golf ball compositions to crosslink and cure the above-described rubber composition. The process may be one which involves, for example, masticating the rubber composition with a suitable apparatus such as a roll mill, kneader or Banbury mixer, then molding under heat and pressure using a mold. The crosslinking conditions are not subject to any particular limitations with regard to temperature and time, although it is preferable to carry out crosslinking at 100 to 200° C. for a period of 10 to 40 minutes.

In the invention, the molded and crosslinked rubber material obtained by molding and crosslinking the above rubber composition is then impregnated with a monomer. This monomer may be at least one compound selected from the group consisting of acrylic acid, methacrylic acid, and alkyl esters, amino group-containing esters, aliphatic ring-containing esters, aromatic ring-containing esters, vinyl group-containing esters, alkoxy group-containing esters and carboxylic acid-containing esters thereof.

The means for impregnating the monomer varies according to the type of monomer. For example, when the monomer is in liquid form, the liquid monomer may be used directly as the impregnating liquid. One such means involves immersing the molded and crosslinked material in the impregnating liquid at preferably 0 to 40° C. for 5 to 200 hours. The longer the period of immersion, the greater the amount of chemical that soaks in and the deeper the penetration of the chemical into the molded and crosslinked rubber material from the surface toward the center thereof. To increase the hardness of the molded and crosslinked rubber material near the center thereof, an even longer period of immersion is required. Such immersion conditions can be suitably selected according to the desired hardness profile of the molded and crosslinked rubber material, including the center hardness, the surface hardness, and the hardness difference therebetween.

If the monomer is a liquid, the molded and crosslinked rubber material may be immersed directly therein. If the monomer is a solid, this chemical may be used after dissolution in any of various solvents.

It is desirable to have the monomer penetrate from the surface of the molded and crosslinked rubber material to a depth of at least 0.3 mm, and preferably at least 0.3 mm but not more than 10 mm, toward the center. To have the monomer penetrate even further toward the interior of the molded and crosslinked rubber material, it is helpful to immerse the molded and crosslinked rubber material in a semi-vulcanized state within the monomer.

In the molded and crosslinked rubber material of the invention, one or both of the following chemical reactions is induced by heating the monomer-impregnated molded and crosslinked rubber material:

(i) chemical reaction of the monomer with the rubber and/or a rubber compounding ingredient, (ii) chemical reaction of the monomer itself.

It should be noted that merely impregnating the monomer into the molded and crosslinked rubber material will not induce a chemical reaction at the interior thereof. To induce a chemical reaction, heat must be applied.

The above chemical reactions (i) and (ii) refer herein specifically to chemical reactions selected from among (1) to (4) below.

(1) Chemical reactions between the monomer and the base rubber.

(2) Chemical reactions of the monomer itself.

(3) When the monomer is an acid group-containing monomer such as acrylic acid, a chemical reaction between the monomer and a metal oxide such as zinc oxide forms an unsaturated carboxylic acid metal salt. In such a case, chemical reactions between this unsaturated carboxylic acid metal salt and the base rubber.

(4) Chemical reactions of the unsaturated carboxylic acid metal salt formed as described above, by itself.

In the present invention, by heating the monomer-impregnated molded and crosslinked rubber material, at least one of the above chemical reactions of (1) to (4) arises independently or combinations of any of above reactions (1) to (4) arise at the same time. Although the details of the mechanism are not clear, these chemical reactions are believed to bring about changes in hardness.

In the practice of the invention, by heating the above monomer-impregnated molded and crosslinked rubber material and thereby altering its hardness profile, it is possible to freely adjust the surface hardness and the hardness difference between the center and the surface. That is, by impregnating a monomer into the above molded and crosslinked rubber material from the surface thereof and heating the resulting impregnated material, it is possible by means of the above chemical reactions (1) to (4) to improve at least the surface hardness. The heating temperature and heating time vary with the type of monomer, although it is preferable to carry out heating within a temperature range of 100 to 180° C. for a period of from 1 minute to 2 hours, and especially preferable to carry out heating at a temperature of at least 80° C. for at period of at least 20 minutes.

A drying step, while not essential to the present invention, may be carried out for the purpose of removing surplus monomer. Specifically, after the monomer has been impregnated under atmospheric pressure or a reduced pressure, it is advantageous to carry out drying at from 0 to 30° C. for a period of from 0.5 to 240 hours.

A specific example of the heating step may involve heating the molded and crosslinked rubber material, either under applied pressure or in the absence of applied pressure, using a mold composed of a top half and a bottom half.

It is advantageous for the molded and crosslinked rubber material, after it has been impregnated with the monomer, dried if necessary, then heated, to have a JIS-C hardness which is at least 5 units higher, and preferably at least 10 units higher, than the molded and crosslinked rubber material prior to impregnation.

The molded and crosslinked rubber material which has been impregnated with a monomer and heat-treated as described above (which material is referred to below as the "monomer-impregnated molded and heated material") is controlled to a diameter of preferably at least 30.0 mm, more preferably at least 32.0 mm, and even more preferably at least 35.0 mm, but preferably not more than 41.0 mm, more preferably not more than 40.5 mm, and even more preferably not more than 40.0 mm.

The monomer-impregnated molded and heated material has a center hardness, expressed as the JIS-C hardness, of preferably 30 to 80, and more preferably 40 to 72. The JIS-C hardness is measured in accordance with JIS K6301-1993.

The monomer-impregnated molded and heated material has a surface hardness, expressed as the JIS-C hardness, of preferably at least 75. At a hardness of 90 to 100 or more, the hardness is difficult to measure with a JIS-C durometer. Hardnesses at this level and above can be measured using a Shore D durometer (a type D durometer according to ASTM D-2240). In such a case, it is preferable for the surface hardness of the monomer-impregnated molded and heated material to not exceed a Shore D hardness of 85.

The monomer-impregnated molded and heated material thus obtained will have a larger hardness difference between the center portion and the vicinity of the surface. Specifically, the value of the surface hardness minus the center hardness of the above monomer-impregnated molded and heated material, expressed in JIS-C hardness units, is preferably from 15 to 45, and more preferably from 17 to 40. At a small hardness difference, the spin rate when the ball is hit with a driver (W#1) may increase, as a result of which the distance traveled by the ball may be less than satisfactory.

The amount of deflection by the monomer-impregnated molded and heated material when subjected to a load of 980 N (100 kg) is suitably selected according to the intended type of golf ball, although it is recommended that the deflection be preferably at least 2.0 mm, and more preferably at least 2.8 mm, but preferably not more than 7 mm, and more preferably not more than 5 mm.

The above-described monomer-impregnated molded and heated material is intended primarily for use in golf balls. Specific applications include one-piece solid golf balls obtained by direct use of the monomer-impregnated molded and heated material, two-piece solid golf balls in which the monomer-impregnated molded and heated material is used as the solid core over the surface of which a one-layer cover is formed, and multi-piece solid golf balls of three or more pieces in which the monomer-impregnated molded and heated material is used as the solid core over the outside of which a cover of two or more layers is formed.

When the above-described monomer-impregnated molded and heated material is used as a one-piece golf ball or as the core of a multi-piece golf ball having two, three or more pieces, the golf ball can be formed to a diameter of preferably at least 42.67 mm, and more preferably from 42.67 to 43.00 mm, and a weight of preferably 45.0 to 45.93 g. When the monomer-impregnated molded and heated material is employed as a solid core, the material of the cover layer and/or mantle layer that encloses the core may be a commonly used cover material such as ionomer resin, polyester, polyurethane or nylon. Various known types of dimples may be formed by known methods on the surface of the golf ball. A known method such as compression molding or injection molding may be used to enclose the core within the cover.

The inventive molded and crosslinked rubber material for golf balls and the inventive method of manufacture thereof enable the hardness profile, which is the surface hardness of the molded and crosslinked rubber material in combination with the cross-sectional hardness at given depths from the surface thereof, to be adjusted as desired. In particular, when the molded and crosslinked rubber material is used as a golf ball core, the degree of freedom in the hardness design of the surface and cross-sectional hardness profile of the core can be increased. As a result, by employing the molded and crosslinked rubber material of the invention is employed in golf balls, ball characteristics such as the spin performance and rebound can be easily controlled or adjusted, enabling a diversity of golf balls to be manufactured in accordance with the desires of golfers.

While the present invention has been described herein with particular attention to the hardness of the molded and crosslinked rubber material prior to monomer impregnation and the hardness of the molded and crosslinked rubber material after monomer impregnation and chemical reaction, large changes in the properties of the molded and crosslinked rubber material other than hardness are also conceivable.

EXAMPLES

The following Examples of the invention and Comparative Examples are provided by way of illustration and not by way of limitation.

Examples 1 and 2, Comparative Example 1

Rubber compositions based on the core formulations shown in Table 1 below were masticated, then were molded and vulcanized at 155° C. for 30 minutes in each example, thereby producing spherical molded and crosslinked rubber materials in Examples 1 and 2 and Comparative Example 1. In each example, the monomer shown in Table 1 (i.e., acrylic acid) was impregnated into the molded and crosslinked rubber material, following which the impregnated material was subjected to heating, thereby changing the hardness profile. The cross-sectional hardnesses of these monomer-impregnated molded and heated materials were measured. The results are shown in Table 2 below.

TABLE 1

| | | | Example | | Comparative Example |
|---|---|---|---|---|---|
| | | | 1 | 2 | 1 |
| Molded and crosslinked material | (Rubber composition, pbw) | | | | |
| | cis-1,4-Polybutadiene | | 100 | 100 | 100 |
| | Zinc oxide | | 20 | 40 | 0 |
| | Organic Peroxide 1 | | 1 | 1 | 1 |
| Crosslinking conditions | Temperature (° C.) | | 155 | 155 | 155 |
| | Time (min) | | 30 | 30 | 30 |
| Impregnation step | Impregnating liquid | | acrylic acid | | |
| | Weight of crosslinked material (g) | Before impregnation | 30.69 | 34.58 | 26.55 |
| | | After impregnation and drying | 30.84 | 34.87 | 26.55 |
| | | Impregnation weight | 0.15 | 0.29 | 0.00 |
| | Temperature (° C.) | | 23 | 23 | 23 |
| | Time (h) | | 19.7 | 19.7 | 19.7 |
| Drying step after impregnation | Temperature (° C.) | | 23 | 23 | 23 |
| | Time (h) | | 120 | 120 | 120 |
| Heating step after drying | Temperature (° C.) | | 150 | 150 | 150 |
| | Time (min) | | 40 | 40 | 40 |

Impregnation and Drying Steps

The rubber compositions shown in the above table were molded under the above-indicated crosslinking conditions, thereby forming spherical molded and crosslinked rubber materials. In each example, the resulting molded material was placed in a beaker containing a sufficient amount of acrylic acid. After 19.7 hours of immersion, the molded material was removed from the beaker and dried at 23° C. and atmospheric pressure. After 96 hours of drying, the molded material was further dried at 23° C. and under reduced pressure, resulting in a total drying time of 120 hours. The monomer-impregnated molded and heated core was cut on a plane that included the center of the sphere, whereupon the color of the impregnated portion of the core layer (impregnated layer) due to impregnation and heating treatment differed from the color of the portion that was not impregnated. It was thus possible to compute the depth, volume and weight of the impregnated layer from this difference in color.

By having, for the sake of convenience, the depth of the impregnated layer during impregnation be the same as the depth of the impregnated layer measured as described above, the parts by weight of the impregnating liquid relative to the polybutadiene within the impregnated layer can be calculated. Also, in Examples 1 and 2, the surface hardnesses and the cross-sectional hardnesses of the cores obtained each differ. As noted above, when the acrylic acid monomer is impregnated into the molded and crosslinked rubber material, the amount of acrylic acid that impregnates into the material can be controlled by neutralizing the acrylic acid impregnating liquid with zinc oxide or the like. Adjusting the amount of acrylic acid impregnation is effective for controlling the surface hardness of the resulting core and the hardness of that portion of the core to the interior of the surface. The acrylic acid impregnating liquid can be neutralized and trapped with zinc oxide and acrylic acid. In such a case, because the amount of zinc oxide is always constant, the respective cross-sectional hardnesses of the core layers obtained by molding, impregnation and heating may be regarded as having a fixed relationship with the amount of impregnated acrylic acid.

TABLE 2

| | | | Example 1 | Example 2 | Comparative Example 1 |
|---|---|---|---|---|---|
| Before impregnation | Properties of resulting core | Diameter (mm) | 37.8 | 37.8 | 37.8 |
| | | Weight (g) | 30.69 | 34.58 | 26.55 |
| | | Surface hardness (JIS-C) | 20 | 22.7 | 22.1 |
| After impregnation | Depth of impregnated layer (mm) | | 0.8 | 0.8 | 0 |
| | Surface hardness of core (JIS-C) | | 50.5 | 86 | 20 |
| | Cross-sectional hardness of core (JIS-C) | At a depth of 0.5 mm from surface | 48 | 83 | 20 |
| | | At a depth of 1 mm from surface | 22.7 | 22.1 | 20 |

Above Table 2 is explained below.

The JIS-C hardness was the hardness measured in each example in accordance with JIS K6301-1993.

The surface hardness is the average of the values measured at two randomly selected points on the core surface.

The core cross-sectional hardness was obtained by cutting the core into two halves and measuring the hardnesses at the positions indicated in Table 2. The numbers shown in the table indicate the average value for two different points located at the same distance from the center (the measurement points were located on two intersecting straight lines which pass through the center of the cut face).

Examples 3 to 7

Rubber compositions based on the core formulations shown in Table 3 below were masticated, then were molded and vulcanized at 155° C. for 30 minutes in each example, thereby producing spherical molded and crosslinked rubber materials in Examples 3 to 7. The monomer shown in Table 3 was impregnated into the molded and crosslinked rubber material, thereby changing the hardness profile. The cross-sectional hardnesses of these monomer-impregnated molded and heated materials were measured. The results are shown in Table 4 below.

TABLE 3

| | | | Example 3 | Example 4 | Example 5 | Example 6 | Example 7 |
|---|---|---|---|---|---|---|---|
| Molded and crosslinked material | (Rubber composition, pbw) | | | | | | |
| | cis-1,4-Polybutadiene | | 100 | 100 | 100 | 100 | 100 |
| | Zinc acrylate | | 0 | 5 | 10 | 20 | 30 |
| | Zinc oxide | | 10 | 10 | 10 | 10 | 10 |
| | Organic Peroxide 1 | | 1 | 1 | 1 | 1 | 1 |
| Crosslinking conditions | Temperature (° C.) | | 155 | 155 | 155 | 155 | 155 |
| | Time (min) | | 30 | 30 | 30 | 30 | 30 |
| Impregnation step | Impregnating liquid | | acrylic acid | | | | |
| | Weight of crosslinked material (g) | Before impregnation | 28.65 | 29.16 | 29.65 | 30.56 | 31.38 |
| | | After impregnation and drying | 28.86 | 29.32 | 29.87 | 30.79 | 31.65 |
| | | Impregnation weight | 0.21 | 0.16 | 0.22 | 0.23 | 0.27 |
| | Temperature (° C.) | | 23 | 23 | 23 | 23 | 23 |
| | Time (h) | | 75 | 75 | 75 | 75 | 75 |
| Drying step after impregnation | Temperature (° C.) | | 23 | 23 | 23 | 23 | 23 |
| | Time (h) | | 120 | 120 | 120 | 120 | 120 |
| Heating step after drying | Temperature (° C.) | | 150 | 150 | 150 | 150 | 150 |
| | Time (min) | | 40 | 40 | 40 | 40 | 40 |

TABLE 4

| | | | Example | | | | |
|---|---|---|---|---|---|---|---|
| | | | 3 | 4 | 5 | 6 | 7 |
| Before impregnation | Properties of resulting core | Diameter (mm) | 37.8 | 37.8 | 37.8 | 37.8 | 37.8 |
| | | Weight (g) | 28.65 | 29.16 | 29.65 | 30.56 | 31.38 |
| | | Surface hardness (JIS-C) | 20.7 | 29.1 | 38.7 | 60.7 | 72.9 |
| After impregnation | Depth of impregnated layer (mm) | | 1.2 | 1.2 | 1.2 | 1.2 | 1.2 |
| | Surface hardness of core (JIS-C) | | 31.7 | 40.7 | 53.7 | 73.1 | 86.7 |
| | Cross-sectional hardness of core (JIS-C) | At a depth of 0.5 mm from surface | 28.1 | 36.9 | 49.1 | 69.1 | 80.5 |
| | | At a depth of 1 mm from surface | 22.2 | 33.3 | 43.2 | 62.7 | 76.5 |
| | | At a depth of 1.5 mm from surface | 20.9 | 29.1 | 38.7 | 60.7 | 72.9 |

Examples 8 to 11, Comparative Example 2

Rubber compositions based on the core formulations shown in Table 5 below were masticated, then were molded and vulcanized at 160° C. for 15 minutes in each example, thereby producing spherical molded and crosslinked rubber materials in Examples 8 to 11 and Comparative Example 2.

The monomer shown in Table 5 (i.e., glycidyl methacrylate) was impregnated into the molded and crosslinked rubber material, thereby changing the hardness profile. The cross-sectional hardnesses of these monomer-impregnated molded and heated materials were measured. The results are shown in Table 6 below.

TABLE 5

| | | | Example | | | | Comparative Example |
|---|---|---|---|---|---|---|---|
| | | | 8 | 9 | 10 | 11 | 2 |
| Molded and crosslinked material | (Rubber composition, pbw) | | | | | | |
| | cis-1,4-Polybutadiene | | 100 | 100 | 100 | 100 | 100 |
| | Zinc oxide | | 16.7 | 16.7 | 16.7 | 16.7 | 16.7 |
| | Zinc acrylate | | 26 | 26 | 26 | 26 | 26 |
| | Zinc salt of pentachlorothiophenol | | 2 | 2 | 2 | 2 | 2 |
| | Organic Peroxide 1 | | 0.3 | 0.3 | 0.3 | 0.3 | 0.3 |
| | Organic Peroxide 2 | | 0.3 | 0.3 | 0.3 | 0.3 | 0.3 |
| Crosslinking conditions | Temperature (° C.) | | 155 | 155 | 155 | 155 | 155 |
| | Time (min) | | 30 | 30 | 30 | 30 | 30 |
| Impregnation step | Impregnating liquid | | glycidyl methacrylate* | | | | — |
| | Weight of crosslinked material (g) | Before impregnation | 40.88 | 40.90 | 40.90 | 40.89 | 40.90 |
| | | After impregnation and drying | 44.24 | 44.25 | 44.26 | 44.24 | 40.90 |
| | | Impregnation weight | 3.36 | 3.35 | 3.36 | 3.30 | 0 |
| | Temperature (° C.) | | 23 | 23 | 23 | 23 | 23 |
| | Time (h) | | 74 | 74 | 74 | 74 | 74 |
| Heating step after drying | Temperature (° C.) | | 120 | 140 | 140 | 140 | none |
| | Time (min) | | 90 | 30 | 40 | 80 | none |

*Glycidyl methacrylate (100 wt %)

TABLE 6

| | | | Example | | | | Comparative Example |
|---|---|---|---|---|---|---|---|
| | | | 8 | 9 | 10 | 11 | 2 |
| Before impregnation | Properties of resulting core | Diameter (mm) | 41.0 | 41.0 | 41.0 | 41.0 | 41.0 |
| | | Weight (g) | 40.88 | 40.90 | 40.90 | 40.89 | 40.90 |
| | | Surface hardness (JIS-C) | 74.8 | 74.7 | 74.8 | 74.7 | 74.8 |
| After impregnation | Depth of impregnated layer (mm) | | 1.5 | 1.5 | 1.5 | 1.5 | 0 |
| | Surface hardness of core (JIS-C) | | 82.2 | 86.0 | 86.6 | 89.6 | 74.8 |

TABLE 6-continued

| | | Example | | | | Comparative Example |
|---|---|---|---|---|---|---|
| | | 8 | 9 | 10 | 11 | 2 |
| Cross-sectional hardness of core (JIS-C) | At a depth of 0.5 mm from surface | 77.7 | 83.1 | 85.8 | 89.5 | 72.0 |
| | At a depth of 1.5 mm from surface | 75.6 | 82.0 | 81.7 | 83.9 | 71.0 |

Trade names for most of the materials appearing in the table are as follows.

cis-1,4-Polybutadiene: BR730 (neodymium catalyst; $ML_{1+4}$ (100° C.), 55), produced by JSR Corporation cis-1,4-Polybutadiene: BR01 (nickel catalyst; $ML_{1+4}$ (100° C.), 43), produced by JSR Corporation Zinc acrylate: Produced by Nihon Jyoryu Kogyo Co., Ltd.

Zinc oxide: Produced by Sakai Chemical Industry Co., Ltd.

2,2'-Methylenebis(4-methyl-6-t-butylphenol): Produced by Ouchi Shinko Chemical Industry Co.

Organic peroxide 1: Dicumyl peroxide, produced by NOF Corporation under the trade name Percumyl D Organic peroxide 2: 1,1-Di(t-butylperoxy)cyclohexane (C-40), produced by NOF Corporation under the trade name Perhexa C-40

The impregnating liquids used here were acrylic acid produced by Nippon Shokubai Co., Ltd., and glycidyl methacrylate produced by Mitsubishi Rayon Co., Ltd.

The invention claimed is:

1. A molded and crosslinked rubber material for golf balls which is obtained by molding and crosslinking a rubber composition comprising rubber and rubber compounding ingredients, including a base rubber, a filler and an organic peroxide, into a spherical body of one or more layers, wherein a monomer is impregnated into the molded and crosslinked rubber material;

one or both of the following chemical reactions is induced:

(i) chemical reaction of the monomer with the rubber and/or a rubber compounding ingredient, (ii) chemical reaction of the monomer itself;

the depth of impregnation by the monomer from a surface of the molded and crosslinked rubber material to the interior thereof is at least 0.3 mm;

the monomer is at least one compound selected from the group consisting of acrylic acid, methylacrylic acid, and alkyl esters, amino group-containing esters, aliphatic ring-containing esters, aromatic ring-containing esters, vinyl group-containing esters, alkoxy group-containing esters, and carboxylic acid-containing esters thereof;

a metal oxide is used as at least one of the filler;

and the amount of deflection by the monomer-impregnated molded and heated material when subjected to a load of 980 N (100 kg) is from 2.0 to 7.0 mm.

2. The molded and crosslinked rubber material for golf balls of claim 1, wherein the molded and crosslinked rubber material is a one-piece golf ball or a solid core for a solid golf ball having a multi-layer construction in which the solid core is enclosed, either directly or over an intervening mantle layer, by a cover.

3. A method of manufacturing a molded and crosslinked rubber material for golf balls, comprising the steps of:

molding and crosslinking a rubber composition comprising rubber and rubber compounding ingredients, including a base rubber, a filler and an organic peroxide, into a spherical body of one or more layers;

impregnating a monomer into the spherical molded and crosslinked rubber material at a temperature of from 0 to 40° C. for 5 to 200 hours; and heating the monomer-impregnated molded and crosslinked rubber material at a temperature range of 100 to 180° C. for a period of from 1 minute to 2 hours and drying it at a temperature of from 0 to 30° C. for a period of from 0.5 to 240 hours.

4. The molded and crosslinked rubber material for golf balls of claim 1, wherein the monomer-impregnated molded and heated material has a center hardness of 30 to 80 and a surface hardness of at least 75, expressed as the JIS-C hardness, and further does not exceed a Shore D hardness of the surface hardness of 85, and the value of the surface hardness minus the center hardness is from 15 to 45, expressed in JIS-C hardness units.

5. The method of manufacturing a molded and crosslinked rubber material for golf balls according to claim 3, wherein the monomer is at least one compound selected from the group consisting of acrylic acid, methacrylic acid, and alkyl esters, amino group-containing esters, aliphatic ring-containing esters, aromatic ring-containing esters, vinyl group-containing esters, alkoxy group-containing esters, and carboxylic acid-containing esters thereof.

6. The method of manufacturing a molded and crosslinked rubber material for golf balls according to claim 3, wherein a metal oxide is used as at least one filler.

7. The method of manufacturing a molded and crosslinked rubber material for golf balls according to claim 3, wherein the molded and crosslinked rubber material is a one-piece golf ball or a solid core for a solid golf ball having a multi-layer construction in which the solid core is enclosed, either directly or over an intervening mantle layer, by a cover.

8. The method of manufacturing a molded and crosslinked rubber material for golf balls according to claim 3, wherein the monomer-impregnated molded and heated material has a center hardness of 30 to 80 and a surface hardness of at least 75, expressed as the JIS-C hardness, and further does not exceed a Shore D hardness of the surface hardness of 85, and the value of the surface hardness minus the center hardness is from 15 to 45, expressed in JIS-C hardness units.

* * * * *